United States Patent [19]

Weir

[11] 4,324,050

[45] Apr. 13, 1982

[54] SCALE MAGNIFIER

[76] Inventor: John R. Weir, 4816 NE. 49th Ave., Vancouver, Wash. 98661

[21] Appl. No.: 120,705

[22] Filed: Feb. 11, 1980

[51] Int. Cl.³ ............................................. G02B 27/02
[52] U.S. Cl. ..................................... 33/488; 350/116
[58] Field of Search .................. 33/488; 350/114–116

[56] References Cited

U.S. PATENT DOCUMENTS

| | | | |
|---|---|---|---|
| 1,773,899 | 8/1930 | Kaler | 33/488 X |
| 1,798,953 | 3/1931 | Rennicke | 350/116 |
| 2,011,945 | 8/1935 | Mathi | 33/488 X |
| 2,502,039 | 3/1950 | Floyd | 33/488 |

*Primary Examiner*—Charles E. Phillips
*Attorney, Agent, or Firm*—Kolisch, Hartwell & Dickinson

[57] ABSTRACT

A magnifier for facilitating visual perception of scale markings on a scale, such as an engineer's scale, includes a magnifying element and a mounting attachment for supporting the magnifying element above the scale. The mounting attachment also includes a pivot connection for permitting selective tilting of the magnifying element about a pivot axis extending generally parallel to the longitudinal axis of the scale. The mounting attachment further permits manual shifting of the magnifier in directions generally paralleling the longitudinal axis of the scale.

1 Claim, 3 Drawing Figures

SCALE MAGNIFIER

BACKGROUND AND SUMMARY OF THE INVENTION

The present invention relates to drafting instruments and aids such as rulers or scales and more particularly to a novel magnifier for use with an engineer's scale to facilitate visual perception of scale markings.

In preparing engineering or working plans and drawings for the construction or fabrication of machinery, buildings, and technical products, it is necessary to prepare detailed, precise renditions according to a predetermined scale. The preparation of such plans and drawings necessarily requires sophisticated drafting techniques utilizing scales and other instruments. A particularly valuable instrument is a so-called engineer's scale which is also known as a triangular scale. Triangular scales include three elongate triangular portions which are radially opposed from one another with each portion having opposed, different indicia or scale markings. Three elongate grooves extend along the length of the triangular scale to permit gripping by a draftsman's fingers for shifting the scale, rotating it about its longitudinal axis to dispose selected scale markings adjacent a workpiece, etc.

It can be appreciated that accurate reading of the scale markings on a triangular scale is necessary in order to properly lay out plans or drawings. Because the scale markings generally are quite small, it is often difficult for a draftsman to accurately perceive markings and locate a pencil or pen adjacent a selected marking during the drawing process. In recognition of this problem several prior art proposals have been made to mount verniers or magnifying instruments on a triangular scale in order to facilitate viewing of the scale markings. Such prior art proposals directed to magnifiers are defective from several standpoints. Primarily, know magnifiers generally permit magnification of only a selected scale and it is necessary to remove the magnifier and locate it on a different position of the scale in order to view different scale markings. Additionally, known scale magnifiers generally do not permit ready adjustability of the magnifier in order to compensate for different visual acuity of draftsmen.

Accordingly, it is a general object of the present invention to provide a magnifier for facilitating visual perception of scale markings on a scale, such as a triangular scale, which includes a magnifying element which is supported above the scale by a mounting means. The mounting means includes pivot means for permitting selective tilting of the magnifying element about a pivot axis extending generally parallel to the longitudinal axis of the scale. The magnifying element overlaps the apex of an upwardly disposed triangular portion of the scale so that upon selective tilting, a draftsman may view a selected one of the scales which is disposed adjacent the workpiece.

Another object of the present invention is to provide a magnifier, as described above, in which the mounting means is mounted on the scale in a manner to permit manual shifting in reciprocal directions generally paralleling the longitudinal axis of the scale. The pivot means, mentioned with respect to pivotally mounting the magnifying element to the mounting means, is positioned for locating the pivot axis above the scale.

Still another object of the present invention is to provide a magnifier, as described above, in which the mounting means includes runner means formed for being slideably received in at least one of the longitudinal grooves of the scale. Extending from the runner means is at least one extension or leg means to which the magnifying element is pivotally connected.

These and additional objects and advantages of the present invention will be more readily understood and appreciated after a consideration of the drawings and the following detailed description of the preferred embodiment.

DETAILED DESCRIPTION OF THE PREFERRED EMBODIMENT

Figure 1:
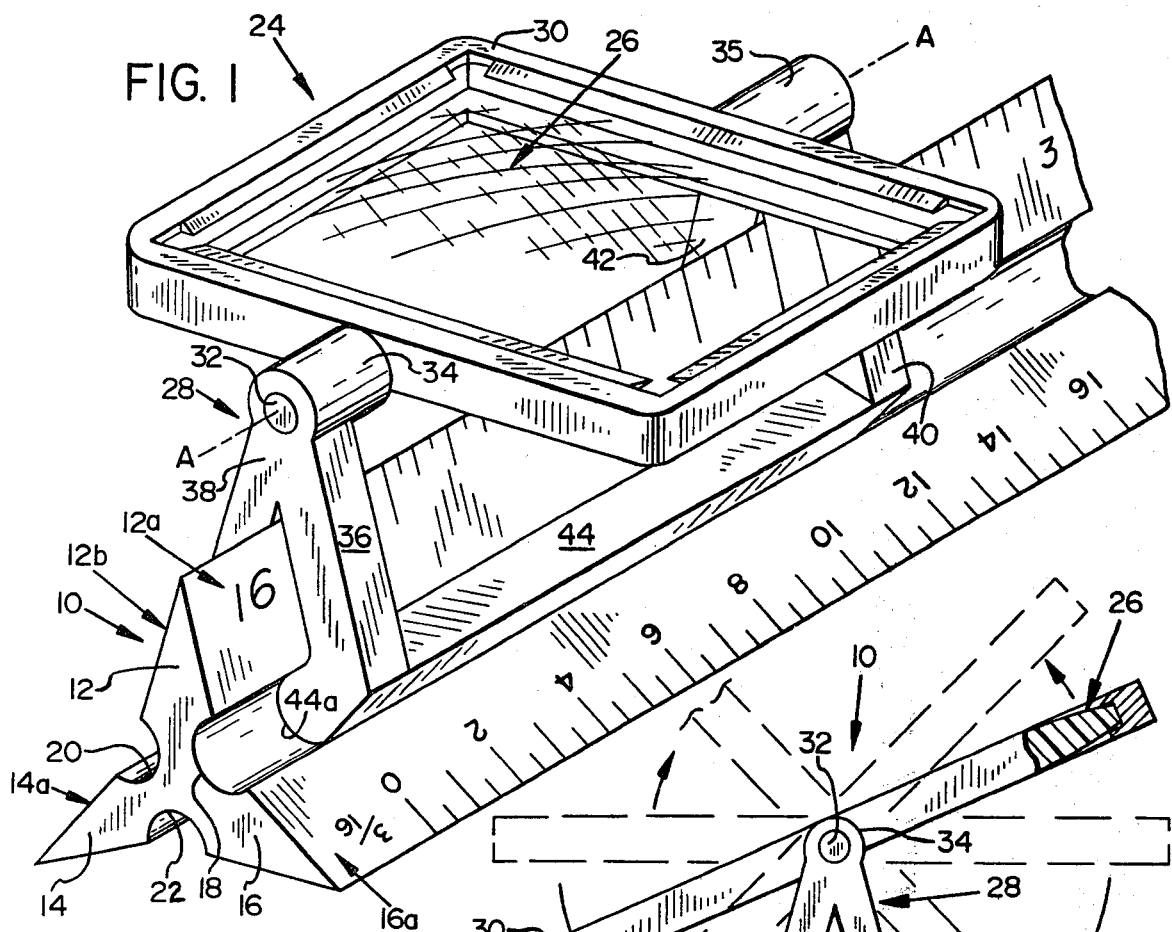
FIG. 1 is a perspective view, of a portion of an engineer's scale upon which is mounted a magnifier, in accordance with the present invention, for facilitating visual perception of scale markings on the scale.

Turning now to the drawings, and referring initially to FIG. 1, there is indicated generally at 10 a conventional triangular or engineer's scale. The scale is of triangular or prismatic form and includes radially extending elongate triangular portions indicated at 12, 14 and 16. Each of the triangular portions is provided on opposite sides thereof with conventional indicia or scale markings. For instance, triangular portion 12 includes scale markings dimensioned in sixteenths, as indicated by the numeral "16" at 12a. Additionally, scale markings defining another indicia are provided on triangular portion 12 at 12b which is on the opposite side of 12a. Similarly, triangular portion 16 includes scale markings indicated at 16a which are dimensioned in increments according to a "3/16" scale. Further, longitudinal grooves such as indicated at 18, 20 and 22 extend parallel to the longitudinal axis of scale 10 and are provided for enabling ready gripping by a draftsman's fingers so that scale 10 may be suitably shifted on a drawing or rotated so that predetermined scale markings face toward the drawing. Scale 10, as described above, is of conventional construction and includes three apexes as shown.

Figure 3:
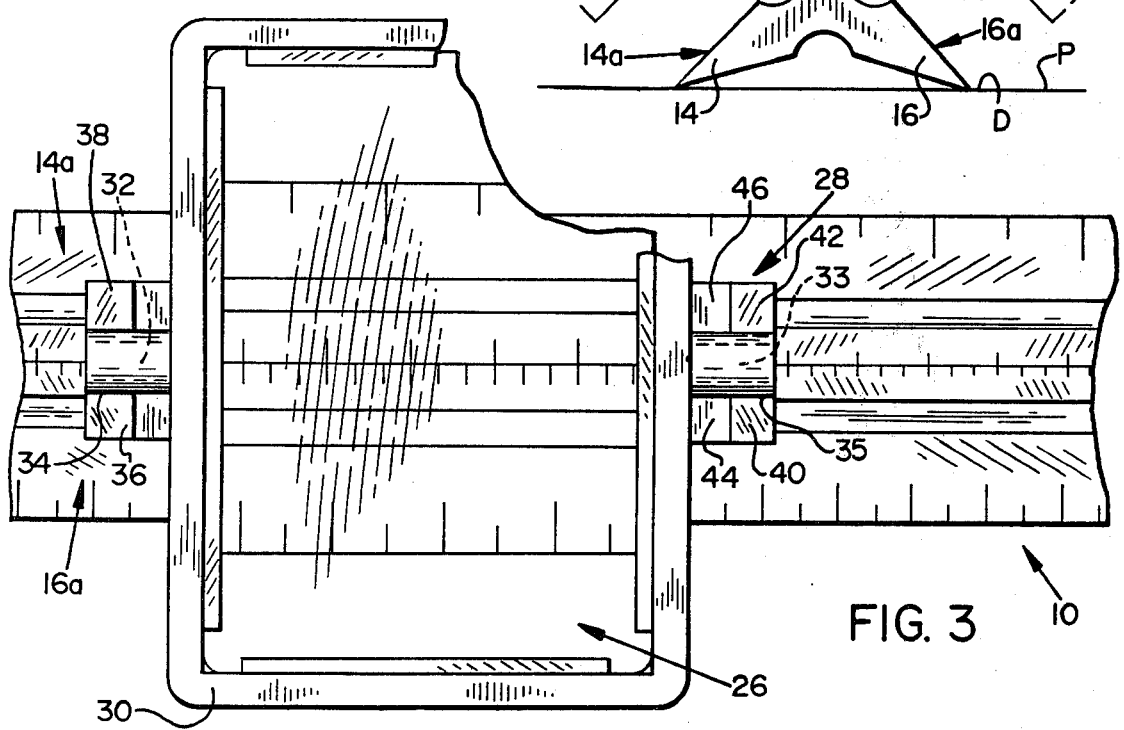
FIG. 3 is a top plan view of the magnifier mounted on an engineer's scale.

A magnifier according to the present invention is generally indicated at 24 and includes a magnifying element generally indicated at 26 and a mounting means generally indicated at 28. Magnifying element 26 includes a suitable magnifying glass which is mounted in a rectangular frame 30. As shown, frame 30 includes a generally rectangular outer boundary which securely receives magnifying element 26 therewithin for supporting same in a rigid manner. Extending from frame 30 on opposite sides thereof are cylindrical projections indicated at 32, 33 (see also FIG. 3) which are rotatably mounted in pivot means such as sleeves 34, 35 respectively. The sleeves are formed as an integral portion of mounting means 28. Thus, it can be seen that mounting means 28 supports magnifying element 26 above scale 10, and more particularly above the apex of triangular portion 12. The pivot means, which includes sleeves such as indicated at 34, 35 permit selective tilting of magnifying element 26 about a pivot axis extending generally parallel to the longitudinal axis of the scale.

Continuing with a description of mounting means 28, it can be seen that it includes two pairs of opposed leg means or legs such as indicated at 36, 38 and 40, 42 which depend from sleeves 34, 35 respectively. Legs 36, 38 are angularly disposed relative to one another so that the angle defined therebetween permits overlapping of interior surfaces of the legs over the triangular portions such as triangular portion 12 as illustrated. Similarly, legs 40, 42 are disposed at an angle relative to one another for accommodating reception of triangular portion 12. Extending between bottom portions of opposed legs for mounting in opposite grooves are runner means, one of which is indicated at 44. As illustrated, runner means 44 is provided with a curved longitudinally extending portion 44a dimensioned for slideable reception within groove 18 of scale 10. Similarly, another runner means is provided for interconnecting legs 38, 42. Such a runner means is indicated at 46 as shown in FIG. 2.

The magnifier as described thus far includes mounting means 28 for supporting magnifying element 26 with the mounting means mounted on the scale in a manner for permitting manual shifting in reciprocal directions generally paralleling the longitudinal axis of the scale. The pivot means, which includes sleeves 34, 35 and projections, such as indicated at 32, 33 locate a pivot axis indicated at A above the scale which extends generally parallel to the longitudinal axis thereof. Further, the runner means, such as indicated at 44, 46 are formed for cooperating with the scale to permit shifting thereof, even to the extent of permitting shifting of magnifier 10 so that it may be totally removed from the scale. This is necessary in order to permit selective positioning of the magnifier in order to visually perceive selected scale markings on the scale. Also, it is to be noted that magnifier 24 spans across the apex of triangular portion 12.

Figure 2:
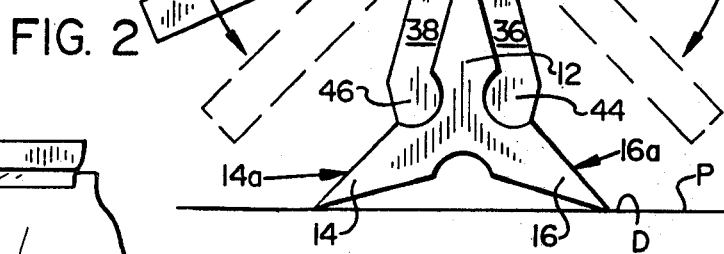
FIG. 2 is a view looking in from the end of the engineer's scale of FIG. 1, illustrating selective tilting of the magnifier.

Generally describing use of magnifier 24 of the present invention, it will be presumed that scale 10 is suitably positioned on a workpiece such as a sheet of drafting paper indicated at P in FIG. 2. A scale, such as scale markings 16a on triangular portion 16 have been suitably positioned along some desired datum D in preparation of a draftsman providing some type of mark or line utilizing the incremental divisions of scale markings 16a. The magnifier is suitably mounted on scale 10 by inserting runner means 44, 46 within grooves 18, 20 respectively and shifting the magnifier to a position adjacent the selected scale markings. As shown in FIG. 2, magnifying element 26 may be suitably tilted about pivot axis A in a clockwise direction so that the magnifying element is disposed proximally to triangular portion 16 and scale markings 16a. By simple manual tilting, the draftsman may position the magnifying element to any predetermined orientation so that visual perception of the scale markings is readily achieved.

In a similar manner, magnifying element 26 may be selectively tilted about pivot axis A in a counterclockwise direction so that the draftsman may readily read scale markings 14a on triangular portion 14 adjacent another datum. This latter action and capability of magnifier 10 finds particular utility if it is desired to move scale markings 14a adjacent to datum D. Explaining further, if it is initially desired to provide scale markings 16a adjacent datum D and then it is subsequently determined to provide scale markings 14a adjacent the datum, it is necessary only to shift scale 10, to the right if viewing FIG. 2, so that scale markings 14a are adjacent the datum. Then, if it is desired to have a closer and more magnified reading of scale markings 14a, magnifying element 26 is readily tilted or pivoted counterclockwise, as shown in FIG. 2, so that the draftsman may readily read the scale markings.

As described above, magnifying element 26 is mounted and dimensioned to span across an apex of a triangular portion, such as the apex of triangular portion 12, so that tilting of the magnifying element enables magnification of scale markings provided adjacent opposed apexes of the scale in a quick, efficient manner. As shown in FIG. 2, such other apexes are those provided on triangular portions 14, 16. Considering FIG. 3, which is a top plan view of magnifier 24 mounted on scale 10, it can be seen that magnification of scale markings 16a, 14a, is readily obtained. If greater magnification of either scale marking is desired, suitable tilting, as described above, may be readily effected by the draftsman.

From the above description, it should be readily apparent that magnifier 24 of the present invention provides several important advantages. A primary advantage is the mounting of magnifying element 26 above a scale apex so that the magnifying element may be suitably tilted about a longitudinal axis, disposed above the apex, so that opposed scale markings may be read. If it is desired to detach magnifier 24, such is a simple matter because mounting means 28 includes runner means, 44, 46 which are suitably shiftable in grooves provided in the scale.

Another advantage of the present invention resides in the provision of runner means 44, 46 which are mounted on the legs of mounting means 28. The runner means permit manual shifting in reciprocal directions generally paralleling the longitudinal axis of the scale so that magnifying element 26 may be positioned at a desired location along the longitudinal axis of the scale. Of course, the runner means may be readily disengaged from sliding attachment with the grooves prior to insertion in different grooves. Additionally, with magnifying element 26 disposed above an apex of a triangular portion, it is thereby positioned out of the way of a drawing instrument such as a pencil or pen.

While the present invention has been shown and described with reference to the foregoing preferred embodiment, it will be understood by those having ordinary skill in the art that other changes in form and detail may be made without departing from the spirit, or scope of the invention as defined in the appended claims.

It is claimed and desired to secure by Letters Patent:

1. A magnifier for facilitating visual perception of scale markings on an engineer's scale having three apexes comprising:

- a mount including legs which detachably engage the scale with portions extending above a first one of the apexes and joining to form a sleeve means;
- a magnifying element connected to said mount so that it spans across the first apex, said magnifying element being dimensioned to extend laterally above the viewable scale markings adjacent the other two apexes; and
- pivot means interconnecting said mount and said magnifying element by being rotatably accepted in said sleeve means, said pivot means being disposed above the first apex, when said mount engages the scale and defining a pivot axis which extends generally parallel to the longitudinal axis of the scale and above the first apex so that said magnifying element may be tilted via said sleeve means and pivot means in a selected one of two directions about the pivot axis and above the first apex to enable magnification of a selected one of the viewable scale markings adjacent the other two apexes.

* * * * *